(12) United States Patent
Amaddeo et al.

(10) Patent No.: US 7,934,528 B2
(45) Date of Patent: May 3, 2011

(54) ELASTOMERIC COMPOSITION INCLUDING AT LEAST ONE SALT OR OXIDE OF A TRANSITION METAL AND TYRE AND TREAD BAND INCLUDING THE COMPOSITION

(75) Inventors: Angela Amaddeo, San Donato Milanese (IT); Luciano Garro, Ornago (IT)

(73) Assignee: Pirelli Pneumatici S.p.A., Milan (IT)

( * ) Notice: Subject to any disclaimer, the term of this patent is extended or adjusted under 35 U.S.C. 154(b) by 1733 days.

(21) Appl. No.: 10/497,240

(22) PCT Filed: Dec. 21, 2001

(86) PCT No.: PCT/IB01/02619
§ 371 (c)(1),
(2), (4) Date: Mar. 10, 2005

(87) PCT Pub. No.: WO03/054081
PCT Pub. Date: Jul. 3, 2003

(65) Prior Publication Data
US 2005/0155687 A1     Jul. 21, 2005

(51) Int. Cl.
*B60C 15/00* (2006.01)
(52) U.S. Cl. .................................................. 152/539
(58) Field of Classification Search ................ 152/539
See application file for complete search history.

(56) References Cited

U.S. PATENT DOCUMENTS

| | | | |
|---|---|---|---|
| 3,451,458 A | 6/1969 | Stueber | |
| 3,856,729 A | 12/1974 | Shimozato et al. | |
| 4,550,142 A | 10/1985 | Akita et al. | |
| 4,742,124 A | 5/1988 | Tsutsumi et al. | |
| 4,768,937 A | 9/1988 | Singh | |
| 4,872,822 A | 10/1989 | Pizzorno | |
| 4,895,692 A | 1/1990 | Laurent et al. | |
| 7,066,228 B2 * | 6/2006 | Grimberg et al. | 152/548 |
| 2002/0123554 A1 * | 9/2002 | Ko et al. | 524/492 |

FOREIGN PATENT DOCUMENTS

| | | |
|---|---|---|
| DE | 2736680 | 3/1979 |
| EP | 0199064 | 10/1986 |
| EP | 0 242 840 | 10/1987 |
| EP | 451604 | 10/1991 |
| EP | 0928680 | 7/1999 |
| EP | 0928702 | 7/1999 |
| GB | 2 360 288 | 9/2001 |
| WO | WO 00/37267 | 6/2000 |

OTHER PUBLICATIONS

CRC Handbook of Chemistry and Physics, (70th Ed. 1989-1990) (periodic table of elements).
A.A. Mukhitdinov et al., "Possibility of Reducing the Amount of Zinc Oxide in Rubber Mix Formulations," International Polymer Science and Technology, vol. 21, No. 7, pp. 48-51, (1994).

* cited by examiner

*Primary Examiner* — Robert D. Harlan
(74) *Attorney, Agent, or Firm* — Finnegan, Henderson, Farabow, Garrett & Dunner, L.L.P.

(57) ABSTRACT

An elastomeric composition includes at least one diene elastomeric polymer, at least one salt or oxide of a transition metal belonging to groups IIIA, IVA, VA, VIA, VIIA, or VIIIA of the Periodic Table, at least one vulcanization accelerator, sulphur or derivatives thereof, and at least one reinforcing filler. The elastomeric composition is substantially free of zinc or derivatives thereof. A tire for a vehicle wheel including at least one component including the elastomeric composition and a tread band for a tire including the elastomeric composition are also disclosed. The at least one diene elastomeric polymer may include a glass transition temperature lower than 20° C. The at least one salt of a transition metal may be an organic or inorganic metal salt. The at least one oxide of a transition metal may include one or more of: cobalt oxide; cerium oxide; molybdenum oxide; manganese oxide; and iron oxide.

50 Claims, 1 Drawing Sheet

FIG. 1

ELASTOMERIC COMPOSITION INCLUDING AT LEAST ONE SALT OR OXIDE OF A TRANSITION METAL AND TYRE AND TREAD BAND INCLUDING THE COMPOSITION

CROSS-REFERENCE TO RELATED APPLICATIONS

This application is a national-phase entry under 35U.S.C. §371 from International Application No. PCT/IB01/02619, filed Dec. 21, 2001, at the International Bureau of the World Intellectual Property Organization, the content of which is relied upon and incorporated herein by reference.

BACKGROUND OF THE INVENTION

1. Field of the Invention

The present invention relates to a tyre for vehicle wheels, to a tread band and to a crosslinkable elastomeric composition.

More particularly, the present invention relates to a tyre for vehicle wheels, comprising at least one component made of a crosslinked elastomeric material including at least one salt or one oxide of a transition metal belonging to groups IIIA to VIIIA of the Periodic Table of the Elements.

The present invention moreover relates to a tread band including a crosslinkable elastomeric composition comprising at least one salt or one oxide of a transition metal belonging to groups IIIA to VIIIA of the Periodic Table of the Elements, and also to an elastomeric composition comprising at least one salt or one oxide of a transition metal belonging to groups IIIA to VIIIA of the Periodic Table of the Elements.

2. Description of the Related Art

Processes for vulcanizing diene elastomeric polymers with sulphur are widely used in the rubber industry for the production of a wide range of manufactured products, and in particular of tyres for vehicle wheels. Although these processes lead to the production of high-quality vulcanized products, they include considerable complexity mainly linked to the fact that, in order to obtain an optimum vulcanization in industrially acceptable times, it is necessary to use a complex vulcanizing system which includes, in addition to sulphur, one or more activators (for example, zinc compounds, and in particular ZnO, $ZnCO_3$, zinc salts of fatty acids such as, for example, zinc stearate) and one or more accelerators (for example, thiazoles, dithiocarbamates, thiurams, guanidine, sulphenamides). The presence of these products may, in some cases, entail considerable problems as regards the harmfulness/toxicity both when being produced and when in use, in particular when the vulcanized manufactured products are intended for medical-health or food use.

The zinc compounds described above are counted among the products that give rise to the abovementioned drawbacks. In this respect, a number of attempts have been made directed towards reducing or eliminating the amount of said compounds, in particular of zinc oxide.

Patent application WO 00/37267 in the name of the Applicant discloses a crosslinkable elastomeric composition that is particularly useful for producing tyre tread bands, comprising: (a) a polymer base containing a crosslinkable unsaturated chain; (b) a vulcanizing system including: (b1) an amount of between 0.5 phr and 2 phr of sulphur, (b2) an amount of between 1.5 phr and 7 phr of at least one vulcanization accelerator containing at least one carbon atom linked to at least two sulphur atoms, (b3) an amount of not greater than 2 phr, expressed in terms of zinc oxide equivalents, of at least one activator. Although reducing the amount of activator, it would thus be possible to obtain a tyre with improved wear resistance capable of maintaining unchanged its characteristic properties of wet road holding and of rolling resistance.

"International Polymer Science and Technology" (1994), Vol. 21, No. 7, pp. 48-51 describes the possibility of reducing the amount of zinc oxide in crosslinkable elastomeric compositions. To this end, a complex which consists of zinc oxide/sulphur/stearic acid/2-mercaptobenzo-thiazole/tetramethylthiuram disulphide is added to said compositions instead of the mechanical mixture of said products that is normally used. In this way, an increase in the rate of vulcanization and a reduction in the vulcanization induction time at low temperatures are said to be achieved.

U.S. Pat. No. 3,856,729 describes a crosslinkable elastomeric composition comprising a butadiene rubber, sulphur and an activator, characterized in that the sulphur and the activator are present in an amount of between 0.1 phr and 0.8 phr, preferably between 0.1 phr and 0.6 phr, and between 0.1 phr and 1.0 phr, preferably between 0.1 phr and 0.5 phr, respectively. Said amounts are appreciably lower than the amounts normally used. The crosslinked manufactured product obtained is said to have good tear strength, good resistance to elongation and good resistance to ageing.

U.S. Pat. No. 3,451,458 describes a sulphur-crosslinkable elastomeric composition that is particularly useful for preparing tyre tread bands, comprising a synthetic diene rubber and silica, said composition being substantially free of activators based on metal oxides, and in particular zinc oxide. The absence of zinc oxide is said to make it possible thereby to obtain tyres with good tensile strength and good wear resistance.

SUMMARY OF THE INVENTION

In the Applicant's view, elastomeric compositions in which the amount of zinc oxide is reduced, or even eliminated, must satisfy a number of requirements in order effectively to make them advantageous to use in the production of crosslinked manufactured products, and in particular of tyres. As a matter of fact, the reduction or elimination of zinc oxide must not compromise the fundamental properties of the crosslinked manufactured product, such as the mechanical properties and the dynamic properties, not to mention the abrasion resistance. In addition, said reduction or elimination should not have a negative impact on the vulcanization times, which could become unacceptable from the point of view of industrial production.

The Applicant has now found that it is possible to obtain crosslinkable elastomeric compositions that are substantially free of zinc or derivatives thereof and that may be advantageously used in the production of crosslinked manufactured products, in particular in the production of tyres, using one salt or one oxide of a transition metal belonging to groups IIIA to VIIIA of the Periodic Table of the Elements. The addition of said salt or oxide makes it possible to obtain, even in the substantial absence of zinc or derivatives thereof, a crosslinked manufactured product that has good mechanical and dynamic properties, while maintaining acceptable vulcanization times. In addition, improved abrasion resistance has been found, in particular when the reinforcing filler comprises silica.

According to a first aspect, the present invention thus relates to a tyre for vehicle wheels, comprising at least one component made of a crosslinked elastomeric material, in which said component includes an elastomeric composition comprising:

(a) at least one diene elastomeric polymer;
(b) at least one salt or one oxide of a transition metal belonging to groups IIIA, IVA, VA, VIA, VIIA or VIIIA of the Periodic Table of the Elements;

(c) at least one vulcanization accelerator;
(d) sulphur or derivatives thereof;
(e) at least one reinforcing filler;
said composition being substantially free of zinc or derivatives thereof.

It should be pointed out that, for the purposes of the present description and the claims which follow, the references to the Periodic Table of the Elements refer to the version of the table published in the "Handbook of Chemistry and Physics", published by the CRC, 1989-1990, using the IUPAC system as regards the groups.

It should also be pointed out that, for the purposes of the present description and the claims which follow, the expression "transition metal belonging to groups IIIA, IVA, VA, VIA, VIIA or VIIIA of the Periodic Table of the Elements" also means metals belonging to the lanthanide series and the actinide series.

According to one preferred embodiment, the transition metal belonging to groups IIIA, IVA, VA, VIA, VIIA or VIIIA of the Periodic Table of the Elements may be selected from: cobalt, nickel, iron, molybdenum, manganese, chromium, cerium, or mixtures thereof.

According to a further preferred embodiment, the present invention relates to a tyre for vehicle wheels, comprising:
 a carcass structure with at least one carcass ply moulded in a substantially toroidal configuration, the opposite lateral edges of which are associated with respective right-hand and left-hand bead wires, each bead wire being enclosed in a respective bead;
 a belt structure comprising at least one belt strip applied in a circumferentially external position relative to said carcass structure;
 a tread band superpositioned circumferentially relative to said belt structure;
 a pair of sidewalls applied laterally on opposite sides relative to said carcass structure;
in which said component that includes said elastomeric composition is the tread band.

According to a further aspect, the present invention relates to a tyre tread band for vehicle wheels, including a crosslinkable elastomeric composition comprising:
(a) at least one diene elastomeric polymer;
(b) at least one salt or one oxide of a transition metal belonging to groups IIIA, IVA, VA, VIA, VIIA or VIIIA of the Periodic Table of the Elements;
(c) at least one vulcanization accelerator;
(d) sulphur or derivatives thereof;
(e) at least one reinforcing filler;
said composition being substantially free of zinc or derivatives thereof.

According to a further aspect, the present invention relates to an elastomeric composition comprising:
(a) at least one diene elastomeric polymer;
(b) at least one salt or one oxide of a transition metal belonging to groups IIIA, IVA, VA, VIA, VIIA or VIIIA of the Periodic Table of the Elements;
(c) at least one vulcanization accelerator;
(d) sulphur or derivatives thereof;
(e) at least one reinforcing filler;
said composition being substantially free of zinc or derivatives thereof.

According to a further aspect, the present invention relates to a crosslinked elastomeric manufactured product obtained by crosslinking said elastomeric composition.

For the purposes of the present description and the claims which follow, the expression "substantially free of zinc or derivatives thereof" means that the elastomeric composition does not comprise the activators commonly used such as zinc compounds, and in particular ZnO, $ZnCO_3$, zinc salts of saturated or unsaturated fatty acids containing from 8 to 18 carbon atoms, such as, for example, zinc stearate, preferably formed in situ in the elastomeric composition from ZnO and fatty acid. In addition, said elastomeric composition is substantially free of other toxic and/or harmful compounds such as, for example, BiO, CdO, HgO, PbO, $Pb_3O_4$, $PbO_2$, or mixtures thereof.

According to one preferred embodiment, the diene elastomeric polymer (a) which may be used in the present invention may be selected from those commonly used in sulphur-crosslinkable elastomeric compositions, that are particularly suitable for producing tyres, that is to say from elastomeric polymers or copolymers with an unsaturated chain having a glass transition temperature ($T_g$) generally below 20° C., preferably between 0° C. and −90° C. These polymers or copolymers may be of natural origin or may be obtained by solution polymerization, emulsion polymerization or gas-phase polymerization of one or more conjugated diolefins, optionally blended with at least one comonomer selected from monovinylarenes and/or polar comonomers in an amount of not more than 60% by weight.

The conjugated diolefins generally contain from 4 to 12, preferably from 4 to 8 carbon atoms, and may be selected, for example, from the group comprising: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene, or mixtures thereof. 1,3-Butadiene, isoprene are particularly preferred.

Monovinylarenes which may optionally be used as comonomers generally contain from 8 to 20, preferably from 8 to 12 carbon atoms, and may be selected, for example, from: styrene; 1-vinylnaphthalene; 2-vinylnaphthalene; various alkyl, cycloalkyl, aryl, alkylaryl or arylalkyl derivatives of styrene such as, for example, α-methylstyrene, 3-methylstyrene, 4-propylstyrene, 4-cyclohexylstyrene, 4-dodecylstyrene, 2-ethyl-4-benzylstyrene, 4-p-tolylstyrene and 4-(4-phenylbutyl)styrene, or mixtures thereof. Styrene is particularly preferred.

Polar comonomers which may optionally be used may be selected, for example, from: vinylpyridine, vinylquinoline, acrylic and alkylacrylic acid esters, nitriles, or mixtures thereof, such as, for example, methyl acrylate, ethyl acrylate, methyl methacrylate, ethyl methacrylate, acrylonitrile, or mixtures thereof.

Preferably, the diene elastomeric polymer (a) which may be used in the present invention may be selected, for example, from: cis-1,4-polyisoprene (natural or synthetic, preferably natural rubber), 3,4-polyisoprene, poly(1,3-butadiene) (in particular poly(1,3-butadiene) with a high 1,4-cis content), optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, or mixtures thereof. Poly(1,3-butadiene) with a high 1,4-cis content and styrene/1,3-butadiene copolymers are particularly preferred.

According to a further preferred embodiment, the diene elastomeric polymer (a) which may be used in the present invention is obtained by solution polymerization.

According to a further preferred embodiment, the elastomeric composition of the present invention may also comprise an elastomeric polymer (a') which may be selected from elastomeric polymers of one or more monoolefins with an olefinic comonomer or derivatives thereof. The monoolefins may be selected from: ethylene and α-olefins generally containing from 3 to 12 carbon atoms, such as, for example, propylene, 1-butene, 1-pentene, 1-hexene, 1-octene, or mixtures thereof. The following are preferred: copolymers between ethylene and an α-olefin, optionally with a diene; isobutene homopolymers or copolymers thereof with small amounts of a diene, which are optionally at least partially halogenated. The diene optionally present generally contains from 4 to 20 carbon atoms and is preferably selected from: 1,3-butadiene, isoprene, 1,4-hexadiene, 1,4-cyclohexadiene, 5-ethylidene-2-norbornene, 5-methylene-2-norbornene, vinylnorbornene, or mixtures thereof. Among these, the following are particularly preferred: ethylene/propylene copolymers (EPR) or ethylene/propylene/diene copolymers (EPDM); polyisobutene; butyl rubbers; halobutyl rubbers, in particular chlorobutyl or bromobutyl rubbers; or mixtures thereof.

A diene elastomeric polymer (a) or an elastomeric polymer (a') functionalized by reaction with at least one suitable terminating agent or coupling agent may also be used. In particular, the diene elastomeric polymers (a) obtained by anionic polymerization in the presence of an organometallic initiator (in particular an organolithium initiator) may be functionalized by reacting the residual organometallic groups derived from the initiator with at least one suitable terminating agent or coupling agent selected, for example, from: imines, carbodiimides, alkyltin halides, substituted benzophenones, alkoxysilanes or aryloxysilanes (see, for example, European patent EP 451 604, or U.S. Pat. No. 4,742,124 and U.S. Pat. No. 4,550,142).

According to one preferred embodiment, the salt of a transition metal belonging to groups IIIA, IVA, VA, VIA, VIIA or VIIIA of the Periodic Table of the Elements (b) may be selected from organic or inorganic metal salts, or mixtures thereof.

Organic metal salts that may be used in the present invention may be selected from the salts of: saturated or unsaturated, aliphatic, alicyclic or aromatic monocarboxylic or dicarboxylic acids containing from 1 to 22 carbon atoms; sulphonic acids; phosphonic acids; boric acids; or mixtures thereof. Saturated or unsaturated, aliphatic or aromatic carboxylic acid salts are preferred.

Specific examples of aliphatic carboxylic acids that may be advantageously used in the present invention are: formic acid, acetic acid, propionic acid, butyric acid, heptanoic acid, ethylhexanoic acid, octanoic acid or neodecanoic acid; or fatty acids such as, for example, stearic acid, oleic acid, linoleic acid, palmitic acid, or mixtures thereof.

Specific examples of aromatic carboxylic acids that may be advantageously used in the present invention are: benzoic acid, naphthoic acid, phthalic acid, p-phenylenediacetic acid, or mixtures thereof.

The abovementioned organic metal salts may also be formed in situ in the elastomeric composition from the oxide or hydroxide of the metal and from the carboxylic acid.

According to one preferred embodiment, the salt of a transition metal belonging to groups IIIA, IVA, VA, VIA, VIIA or VIIIA of the Periodic Table of the Elements (b) may be selected from organic metal salts such as, for example, cobalt naphthenate, nickel naphthenate, nickel octanoate, cerium octanoate, molybdenum octanoate, cobalt propionate, nickel propionate, iron octanoate, nickel stearate, or mixtures thereof. Cobalt naphthenate, nickel octanoate are preferred.

According to a further preferred embodiment, the salt of a transition metal belonging to groups IIIA, IVA, VA, VIA, VIIA or VIIIA of the Periodic Table of the Elements (b) may be selected from inorganic metal salts such as, for example, hydroxides, halides, sulphates, carbonates, phosphates, nitrates, or mixtures thereof.

Specific examples of inorganic metal salts that may be used according to the present invention are: iron hydroxide, cobalt hydroxide, cobalt carbonate, iron sulphate, or mixtures thereof.

According to a further preferred embodiment, the oxide of a transition metal belonging to groups IIIA, IVA, VA, VIA, VIIA or VIIIA of the Periodic Table of the Elements (b) may be selected from: cobalt oxide, cerium oxide, molybdenum oxide, manganese oxide, iron oxide, or mixtures thereof. Iron oxide, manganese oxide are preferred.

According to one preferred embodiment, said salt or oxide of a transition metal belonging to groups IIIA, IVA, VA, VIA, VIIA or VIIIA of the Periodic Table of the Elements (b) is added to the elastomeric composition in an amount such that the amount of metal present in said composition is between 0.05 phr and 5 phr, preferably between 0.5 phr and 2 phr.

For the purposes of the present description and the claims, the expression "phr" means the parts by weight of a given component of the elastomeric composition per 100 parts by weight of elastomeric polymer.

According to one preferred embodiment, the vulcanization accelerator (c) may be selected from:

thiazoles such as, for example, 2-mercaptobenzothiazole (MBT), the zinc salt of 2-mercaptobenzothiazole (ZMBT), 2-mercaptobenzothiazole disulphide (MBTS), 2,4-dinitrophenyl-mercaptobenzothiazole;

sulphenamides such as, for example, N-cyclohexyl-2-benzothiazylsulphenamide (CBS), N-oxydiethylene-2-benzothiazylsulphenamide (OBS), N-t-butyl-2-benzothiazylsulphenamide (TBBS), N,N-dicyclohexyl-2-benzothiazylsulphenamide (DCBS);

guanidines such as, for example, diphenylguanidine (DPG), di-o-tolylguanidine (DOTG), o-tolylbiguanide (OTBG);

thiurams such as: thiuram monosulphides [for example, tetramethylthiuram monosulphide (TMTM)]; thiuram disulphides [for example, tetramethylthiuram disulphide (TMT or TMTD)], tetraethylthiuram disulphide (TETD), tetrabutylthiuram disulphide (TBTD or TBTS), dimethyldiphenylthiuram disulphide (MPTD), diethyldiphenylthiuram disulphide (EPTD)]; thiuram tetrasulphides (for example, pentamethylenethiuram tetrasulphide); thiuram hexasulphides (pentamethylenethiuram hexasulphide);

dithiocarbamates such as, for example, zinc N-dimethyldithiocarbamate (ZDMC), zinc N-diethyldithiocarbamate (ZDEC), zinc N-dibutyldithiocarbamate (ZDBC), zinc N-ethylphenyldithiocarbamate (ZEPC), zinc N-pentamethylenedithiocarbamate (ZCMC), zinc N-dibenzyldithiocarbamate (ZBEC), tellurium N-diethyldithiocarbamate (Te DEC or TDEC), selenium N-diethyl-dithiocarbamate (Se DEC), cadmium N-diethyldithiocarbamate (Cd DEC), copper N-diethyldithiocarbamate (Cu DEC), lead N-diethyldithiocarbamate (LDMC), lead N-diamyldithiocarbamate (LDAC), bismuth N-dimethyldithiocarbamate (Bi DMC), piperidine N-pentamethylenedithiocarbamate (PPC), or mixtures of dithiocarbamates;

Schiff's bases and other amino accelerators such as, for example, products of condensation between homologous acroleins with aromatic bases; butyraldehyde-aniline (BAA) condensation products; tricrotonylidene-tetramine (TLT); cyclohexylethylamine (CEA), polyethylenepolyamine (PEP), hexamethylenetetramine (HEXA);

xanthates such as, for example, zinc isopropyl xanthate (ZIX), zinc butyl xanthate (ZBX), sodium isopropyl xanthate (NaIX), disulphidedibutyl xanthate (DBX).

Said vulcanization accelerator (c) is added to the elastomeric composition in an amount generally of between 0.5 phr and 5 phr, preferably between 1 phr and 3 phr.

According to one preferred embodiment, the sulphur or derivatives thereof (d) may be selected from:

soluble sulphur (crystalline sulphur);
insoluble sulphur (polymeric sulphur);
sulphur dispersed in oil (for example 33% sulphur known under the trade name Crystex® OT33 from Flexsys);
sulphur donors such as, for example, tetramethylthiuram disulphide (TMTD), tetrabenzylthiuram disulphide (TBzTD), tetraethylthiuram disulphide (TETD); tetrabutylthiuram disulphide (TBTD), dimethyldiphenylthiuram disulphide (MPTD), pentamethylenethiuram tetrasulphide or hexasulphide (DPTT), morpholinobenzothiazole disulphide (MBSS), N-oxydiethylenedithiocarbamyl-N'-oxydiethylenesulphenamide (OTOS), dithiodimorpholine (DTM or DTDM), caprolactam disulphide (CLD).

Said sulphur or derivatives thereof (c) are added to the elastomeric composition in an amount generally of between 0.5 phr and 5 phr, preferably between 1 phr and 3 phr.

According to one preferred embodiment, the reinforcing filler (e) may be selected from carbon black, silica, alumina, aluminosilicates, calcium carbonate, kaolin, or mixtures thereof.

The types of carbon black which may be used according to the present invention may be selected from those conventionally used in the production of tyres, generally having a surface area of not less than 20 m²/g (determined by CTAB absorption as described in ISO standard 6810).

The silica which may be used according to the present invention may generally be a pyrogenic silica or, preferably, a precipitated silica, with a BET surface area (measured according to ISO standard 5794/1) of between 50 m²/g and 500 m²/g, preferably between 70 m²/g and 200 m²/g.

When a reinforcing filler comprising silica is present, the elastomeric composition may advantageously incorporate a coupling agent capable of interacting with the silica and of linking it to the elastomeric base during the vulcanization.

Coupling agents that are preferably used are those based on silane which may be identified, for example, by the following structural formula (II):

$(R)_3Si-C_nH_{2n}-X$ (II)

in which the groups R, which may be identical or different, are selected from: alkyl, alkoxy or aryloxy groups or from halogen atoms, on condition that at least one of the groups R is an alkoxy or aryloxy group; n is an integer between 1 and 6 inclusive; X is a group selected from: nitroso, mercapto, amino, epoxide, vinyl, imide, chloro, $-(S)_mC_nH_{2n}-Si-(R)_3$ in which m and n are integers between 1 and 6 inclusive and the groups R are defined as above.

Coupling agents that are particularly preferred are bis(3-triethoxysilylpropyl) tetrasulphide and bis(3-triethoxysilylpropyl) disulphide. Said coupling agents may be used as is or as a suitable mixture with a small amount of inert filler (for example carbon black) so as to facilitate their incorporation into the elastomeric composition.

Said reinforcing filler (e) is added to the composition in an amount generally of between 1 phr and 150 phr, preferably between 40 phr and 100 phr.

The elastomeric composition according to the present invention may be vulcanized according to known techniques.

To this end, in the composition, after a first stage of thermo-mechanical processing, a sulphur-based vulcanizing agent is incorporated together with vulcanization accelerators. In this second processing stage, the temperature is generally kept below 120° C., preferably below 100° C., so as to avoid any unwanted pre-cross-linking phenomena.

The elastomeric composition according to the present invention may comprise other commonly used additives selected on the basis of the specific application for which the composition is intended. For example, the following may be added to said composition: antioxidants, anti-ageing agents, plasticizers, adhesives, anti-ozone agents, modifying resins, fibres (for example Kevlar® pulp), or mixtures thereof.

In particular, for the purpose of further improving the processability, a plasticizer generally selected from mineral oils, vegetable oils, synthetic oils, or mixtures thereof, such as, for example, aromatic oil, naphthenic oil, phthalates, soybean oil, or mixtures thereof, may be added to the elastomeric composition according to the present invention. The amount of plasticizer can generally range between 2 phr and 100 phr and preferably between 5 phr and 50 phr.

The elastomeric composition according to the present invention may be prepared by mixing together the polymer components with the reinforcing filler optionally present and with the other additives according to techniques known in the art. The mixing may be carried out, for example, using an open mixer of open-mill type, or an internal mixer of the type with tangential rotors (Banbury) or with interlocking rotors (Intermix), or in continuous mixers of Ko-Kneader type (Buss) or of co-rotating or counter-rotating twin-screw type.

BRIEF DESCRIPTION OF THE DRAWINGS

The present invention will now be illustrated in further detail by means of a number of illustrative embodiments, with reference to the attached FIG. 1, which is a view in cross section of a portion of a tyre made according to the invention.

DETAILED DESCRIPTION OF THE EXEMPLARY EMBODIMENTS

Figure 1:
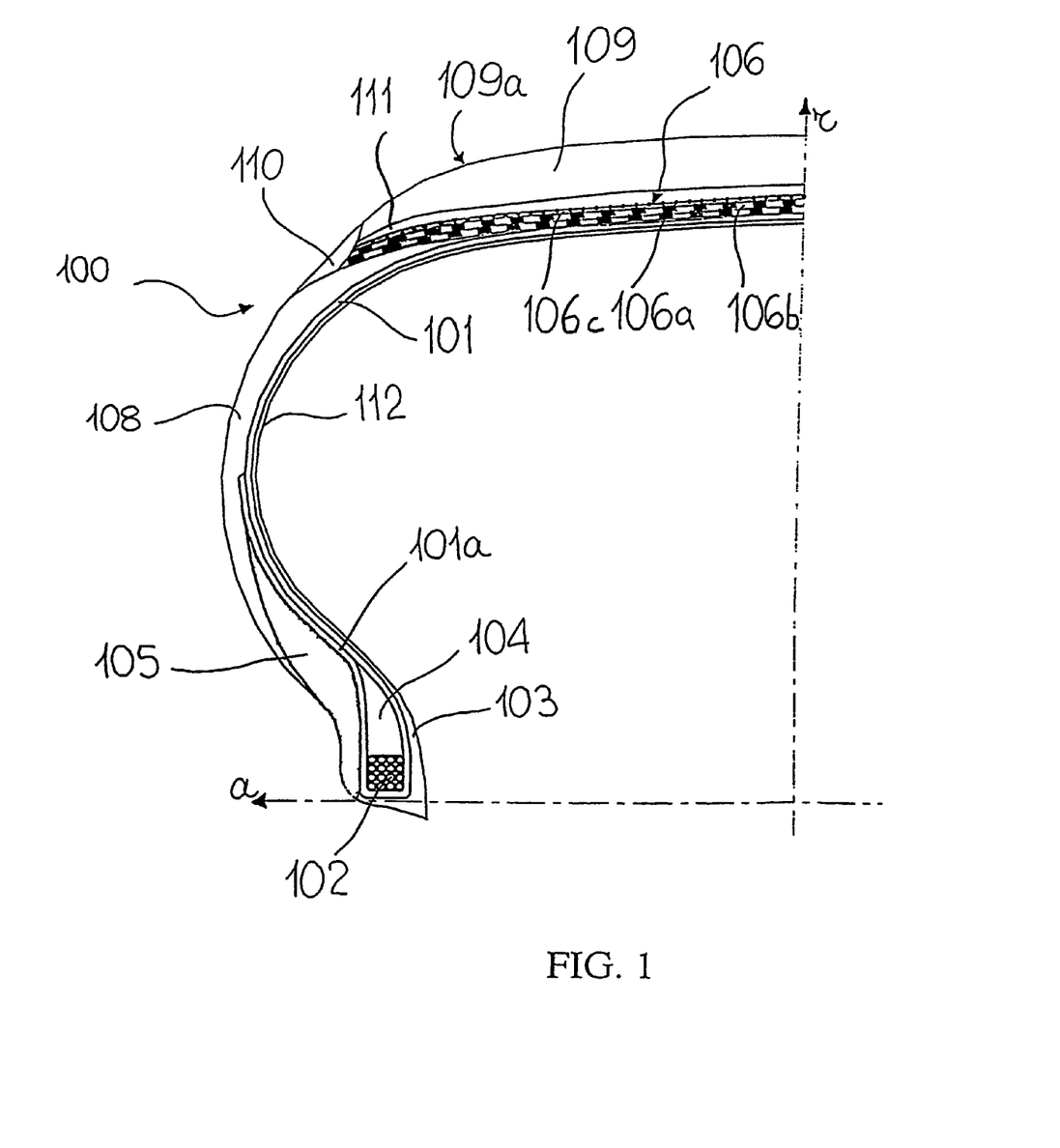

"a" indicates an axial direction and "r" indicates a radial direction. For simplicity, FIG. 1 shows only a portion of the tyre, the remaining portion not represented being identical and symmetrically arranged with respect to the radial direction "r".

The tyre (100) comprises at least one carcass ply (101), the opposite lateral edges of which are associated with respective bead wires (102). The association of the carcass ply (101) to the bead wires (102) is achieved here by folding back the opposite lateral edges of the carcass ply (101) around the bead wires (102) so as to form so-called carcass back-folds (101a) as shown in FIG. 1.

Alternatively, the conventional bead wires (102) can be replaced with a pair of circumferentially inextensible annular inserts formed from elongate components arranged in concentric coils (not represented in FIG. 1) (see, for example, European patent applications EP 928 680 and EP 928 702). In this case, the carcass ply (101) is not back-folded around said annular inserts, the coupling being provided by a second carcass ply (not represented in FIG. 1) applied externally over the first.

The carcass ply (101) generally consists of a plurality of reinforcing cords arranged parallel to each other and at least partially coated with a layer of elastomeric composition. These reinforcing cords are usually made of textile fibres such as, for example, rayon, nylon, polyethylene terephthalate, or of steel wires stranded together, coated with a metal alloy (for example copper/zinc, zinc/manganese, zinc/molybdenum/cobalt alloys and the like).

The carcass ply (101) is usually of radial type, i.e. it incorporates reinforcing cords arranged in an essentially perpendicular direction relative to a circumferential direction. Each bead wire (102) is enclosed in a bead (103), defined along an inner circumferential edge of the tyre (100), with which the tyre engages on a rim (not represented in FIG. 1) forming part of a vehicle wheel. The space defined by each carcass back-fold (101a) contains a bead filler (104) in which the bead wires (102) are embedded. An antiabrasive belt (105) is usually placed in an axially external position relative to the carcass back-fold (101a).

A belt structure (106) is applied along the circumference of the carcass ply (101). In the specific embodiment in FIG. 1, the belt structure (106) comprises two belt strips (106a, 106b) which incorporate a plurality of reinforcing cords, typically metal cords, parallel to each other in each strip and at intersecting with respect to the adjacent strip, oriented so as to form a predetermined angle relative to a circumferential direction. At least one reinforcing layer (106c) can optionally be applied on the radially outermost belt strip (106b) at zero degrees, commonly known as a "0° band", which generally incorporates a plurality of reinforcing cords, typically textile cords, arranged at an angle of a few degrees relative to a circumferential direction, and coated and welded together by means of an elastomeric material.

A sidewall (108) is also applied externally onto the carcass ply (101), this sidewall extending, in an axially external position, from the bead (103) to the end of the belt structure (106).

A tread band (109), whose lateral edges meet the sidewalls (108), is applied circumferentially in a position radially external to the belt structure (106). Externally, the tread band (109), which can be produced according to the present invention, has a rolling surface (109a) designed to come into contact with the ground. Circumferential grooves linked by transverse notches (not represented in FIG. 1) so as to define a plurality of blocks of various shapes and sizes distributed over the rolling surface (109a) are generally made in this surface (109a), which is represented for simplicity in FIG. 1 as being smooth.

A strip made of elastomeric material (110), commonly known as a "mini-sidewall", may optionally be present in the connecting zone between the sidewalls (108) and the tread band (109), this mini-sidewall generally being obtained by co-extrusion with the tread band and allowing an improvement in the mechanical interaction between the tread band (109) and the sidewalls (108). Alternatively, the end portion of the sidewall (108) directly covers the lateral edge of the tread band (109). A underlayer which forms, with the tread band (109), a structure commonly known as a "cap and base" (not represented in FIG. 1) may optionally be placed between the belt structure (106) and the tread band (109).

A layer of elastomeric material (111) which serves as an "attachment sheet", i.e. a sheet capable of providing the connection between the tread band (109) and the belt structure (106), may be placed between the tread band (109) and the belt structure (106).

In the case of tyres without an inner tube (tubeless tyres), a rubber layer (112) generally known as a "liner", which provides the necessary impermeability to the inflation air of the tyre, may also be provided in a radially internal position relative to the carcass ply (101).

The process for producing the tyre according to the present invention can be carried out according to techniques and using apparatus that are known in the art, as described, for example, in patents EP 199 064, U.S. Pat. Nos. 4,872,822 and 4,768,937, said process including at least one stage of manufacturing the green tyre and at least one stage of vulcanizing this tyre.

More particularly, the process for producing the tyre comprises the stages of preparing, beforehand and separately from each other, a series of semi-finished products corresponding to the various parts of the tyre (carcass plies, belt structure, bead wires, fillers, sidewalls and tread band) which are then combined together using a suitable manufacturing machine. Next, the subsequent vulcanization stage welds the above-mentioned semi-finished products together to give a monolithic block, i.e. the finished tyre.

Naturally, the stage of preparation of the abovementioned semi-finished products is preceded by a stage of preparation and moulding of the relevant elastomeric compositions, of which said semi-finished products are made, according to conventional techniques.

The green tyre thus obtained is then passed to the subsequent stages of moulding and vulcanization. To this end, a vulcanization mould is used which is designed to receive the tyre being processed inside a moulding cavity having countermoulded walls which define the outer surface of the tyre when the vulcanization is complete.

Alternative processes for producing a tyre or parts of a tyre without using semi-finished products are disclosed, for example, in the abovementioned patent applications EP 928 680 and EP 928 702.

The green tyre can be moulded by introducing a pressurized fluid into the space defined by the inner surface of the tyre, so as to press the outer surface of the green tyre against the walls of the moulding cavity. In one of the moulding methods widely practised, a vulcanization chamber made of elastomeric material, filled with steam and/or another pressurized fluid under, is inflated inside the tyre closed inside the moulding cavity. In this way, the green tyre is pushed against the inner walls of the moulding cavity, thus obtaining the desired moulding. Alternatively, the moulding can be carried out without an inflatable vulcanization chamber, by providing inside the tyre a toroidal metal support shaped according to the configuration of the inner surface of the tyre to be obtained, as decribed, for example, in patent EP 242,840. The difference in coefficient of thermal expansion between the toroidal metal support and the crude elastomeric material is exploited to achieve an adequate moulding pressure.

At this point, the stage of vulcanizing the crude elastomeric material present in the tyre is carried out. To this end, the outer wall of the vulcanization mould is placed in contact with a heating fluid (generally steam) such that the outer wall reaches a maximum temperature generally of between 100° C. and 230° C. Simultaneously, the inner surface of the tyre is heated to the vulcanization temperature using the same pressurized fluid used to press the tyre against the walls of the moulding cavity, heated to a maximum temperature of between 100° C. and 250° C. The time required to obtain a satisfactory degree of vulcanization throughout the mass of the elastomeric material can vary in general between 3 minutes and 90 minutes and depends mainly on the dimensions of the tyre. When the vulcanization is complete, the tyre is removed from the vulcanization mould.

Although the present invention has been illustrated specifically in relation to a tyre, other crosslinked elastomeric manufactured products that can be produced according to the invention may be, for example, conveyor belts, drive belts or hoses.

The present invention will be further illustrated below by means of a number of illustrative embodiments, which are given for purely indicative purposes and without any limitation of this invention.

EXAMPLES 1-6

The elastomeric compositions given in Table 1 were prepared as follows (the amounts of the various components are expressed in phr).

All the components given in Table 1, except for the sulphur and the accelerator, were placed in an internal mixer of the laboratory type with tangential rotors (Banbury) model PL 1.6 from Pomini, and stirred at about 75 rpm. After about 3 minutes and, in any case, as soon as the temperature reached 150° C., said composition was discharged from the mixer.

After cooling to room temperature (about 23° C.), said composition was placed in an open laboratory mixer and the remaining components, i.e. sulphur and accelerator, were added. The composition was discharged from the mixer when the temperature reached 90° C.

TABLE 1

| | EXAMPLE | | | | | |
|---|---|---|---|---|---|---|
| | 1 (*) | 2 | 3 | 4 | 5 | 6 |
| S-SBR | 75.0 | 75.0 | 75.0 | 75.0 | 75.0 | 75.0 |
| BR | 25.0 | 25.0 | 25.0 | 25.0 | 25.0 | 25.0 |
| Aromatic oil | 5.0 | 5.0 | 5.0 | 5.0 | 5.0 | 5.0 |
| Silica | 63.0 | 63.0 | 63.0 | 63.0 | 63.0 | 63.0 |
| Silane | 10.0 | 10.0 | 10.0 | 10.0 | 10.0 | 10.0 |
| Stearic acid | 2.0 | 2.0 | 2.0 | 2.0 | 2.0 | 2.0 |
| Antioxidant | 2.0 | 2.0 | 2.0 | 2.0 | 2.0 | 2.0 |
| Zinc oxide | 2.0 | — | — | — | — | — |
| Cerium oxide | — | 0.5 | — | — | — | — |
| Chromium oxide | — | — | 0.5 | — | — | — |
| Molybdenum oxide | — | — | — | 0.5 | — | — |
| Manganese oxide | — | — | — | — | 0.5 | — |
| Iron oxide | — | — | — | — | — | 0.5 |
| Accelerator | 2.4 | 2.8 | 2.8 | 2.8 | 2.8 | 2.8 |
| Sulphur | 1.2 | 0.8 | 0.8 | 0.8 | 0.8 | 0.8 |

(*) = comparative.
S-SBR: styrene/butadiene copolymer, obtained by solution polymerization, containing 25% by weight of styrene, mixed with 37.5 phr of oil (Buna ® VSL 5025-1 - Bayer);
BR: cis-1,4-polybutadiene (Europrene ® Neocis BR40 - EniChem Elastomeri);
Silica: precipitated silica (Ultrasil ® VN3 - Degussa);
Silane: bis(3-triethoxysilylpropyl) tetrasulphide (product X50S containing 50% carbon black and 50% silane - Degussa) (the amounts given in the table refer only to the silane);
Antioxidant: N-(1,3-dimethylbutyl)-N'-phenyl-p-phenylenediamine (Vulkanox ® 4020 - Bayer);
Accelerator: N-cyclohexyl-1-2-benzothiazylsulphenamide (CBS) (Vulkacit ® CZ - Bayer).

The compositions thus prepared were subjected to a series of tests intended to measure a number of characteristic parameters of the crosslinked elastomeric compositions. The parameters taken into consideration were the following:
TS2=time at 170° C. required to obtain an increase of two rheometric units measured using an MDR 2000 type Monsanto rheometer;
T90=time at 170° C. required to reach 90% of the final couple value measured using an MDR 2000 type Monsanto rheometer;
IRHD=International Rubber Hardness Degree, measured in accordance with DIN standard 53519, part 1;
EY=% elasticity yeld measured using a torsion pendulum (Zerbinii pendulum) in accordance with ISO standard 4662;
CA 1=tensile strength (relative to the cross section of the test sample) to have a 100% deformation, measured in accordance with DIN standard 53504;
CA 3=tensile strength (relative to the cross section of the test sample) to have a 300% deformation, measured in accordance with DIN standard 53504;
SB=stress at break, measured in accordance with DIN standard 53504;
EB=elongation at break, measured in accordance with DIN standard 53504;
E' 0° C.=elastic modulus measured at 0° C.;
E' 23° C.=elastic modulus measured at 23° C.;
E' 70° C.=elastic modulus measured at 70° C.;
Tan delta 0° C.=ratio between the viscous modulus (E") and the elastic modulus (E') measured at 0° C.;
Tan delta 23° C.=ratio between the viscous modulus (E") and the elastic modulus (E') measured at 23° C.;
Tan delta 70° C.=ratio between the viscous modulus (E") and the elastic modulus (E') measured at 70° C.;
abraded volume: amount of compound removed by operating under the standard conditions given in DIN standard 53516.

The E', E" and Tan delta values were recorded using a dynamic Instron device in traction-compression according to the following methods. A test sample of the crosslinked material of cylindrical shape (length=25 mm; diameter=14 mm), pre-loaded in compression up to a longitudinal deformation of 25% relative to the initial length and maintained at the preset temperature (0° C., 23° C. and 70° C.) throughout the test, was subjected to a dynamic sinusoidal deformation with an amplitude of ±3.33% relative to the length under preloading, with a frequency of 100 Hz.

The results of the tests carried out are given in Table 2.

TABLE 2

| PROPERTIES | Ex. 1 (*) | Ex. 2 | Ex. 3 | Ex. 4 | Ex. 5 | Ex. 6 |
|---|---|---|---|---|---|---|
| RHEOMETRIC PROPERTIES | | | | | | |
| TS2 (min) | 1.8 | 1.57 | 1.52 | 1.52 | 1.58 | 1.53 |
| T90 (min) | 5.6 | 6.78 | 6.72 | 6.76 | 6.82 | 6.77 |
| MECHANICAL PROPERTIES | | | | | | |
| IRHD (23° C.) | 67.0 | 64.0 | 63.0 | 62.0 | 62.0 | 63.0 |
| IRHD (100° C.) | 60.0 | 57.0 | 57.0 | 57.0 | 57.0 | 57.0 |
| EY (23° C.) | 34.6 | 34.6 | 35.0 | 35.2 | 36.0 | 35.0 |
| CA 1 (Mpa) | 2.4 | 2.1 | 2.0 | 2.1 | 2.1 | 2.0 |
| CA 3 (Mpa) | 9.7 | 10.5 | 9.9 | 10.5 | 10.5 | 10.5 |
| SB (Mpa) | 15.3 | 14.5 | 14.9 | 14.6 | 13.0 | 14.3 |
| EB (%) | 420.0 | 405.0 | 439.1 | 415.6 | 383.0 | 404.7 |
| DYNAMIC PROPERTIES | | | | | | |
| E' (0° C.) | 14.7 | 14.1 | 14.0 | 13.7 | 13.7 | 14.2 |
| E' (23° C.) | 9.1 | 8.0 | 7.5 | 7.7 | 7.7 | 7.9 |
| E' (70° C.) | 5.5 | 5.0 | 4.8 | 4.8 | 4.7 | 5.0 |
| Tan delta (0° C.) | 0.670 | 0.677 | 0.680 | 0.675 | 0.675 | 0.673 |
| Tan delta (23° C.) | 0.334 | 0.326 | 0.320 | 0.324 | 0.323 | 0.323 |
| Tan delta (70° C.) | 0.130 | 0.135 | 0.137 | 0.133 | 0.132 | 0.135 |
| ABRASION | | | | | | |
| Abrasion | 90.0 | 55.0 | 61.5 | 56.0 | 52.6 | 59.4 |

(*): comparative.

EXAMPLES 7-11

The elastomeric compositions given in Table 3 were prepared according to the same methods described for Examples 1-6 (the amounts of the various components are expressed in phr).

TABLE 3

|  | \multicolumn{5}{c}{EXAMPLE} | | | | |
|---|---|---|---|---|---|
|  | 7 (*) | 8 | 9 | 10 | 11 |
| SBR | 75.0 | 75.0 | 75.0 | 75.0 | 75.0 |
| BR | 25.0 | 25.0 | 25.0 | 25.0 | 25.0 |
| Aromatic oil | 5.5 | 5.5 | 5.5 | 5.5 | 5.5 |
| Silica | 63.0 | 63.0 | 63.0 | 63.0 | 63.0 |
| Silane | 10.0 | 10.0 | 10.0 | 10.0 | 10.0 |
| Stearic acid | 2.0 | 2.0 | 2.0 | 2.0 | 2.0 |
| Antioxidant | 2.0 | 2.0 | 2.0 | 2.0 | 2.0 |
| Zinc oxide | 2.0 | — | — | — | — |
| Cobalt naphthenate | — | 2.0 | — | — | — |
| Cerium octanoate | — | — | 4.2 | — | — |
| Molybdenum octanoate | — | — | — | 6.25 | — |
| Nickel octanoate | — | — | — | — | 3.8 |
| Accelerator | 2.4 | 2.8 | 2.8 | 2.8 | 2.8 |
| Sulphur | 1.2 | 0.8 | 0.8 | 0.8 | 0.8 |

(*) = comparative.
S-SBR: styrene/butadiene copolymer, obtained by solution polymerization, containing 25% by weight of styrene, mixed with 37.5 phr of oil (Buna ® VSL 5025-1 - Bayer);
BR: cis-1,4-polybutadiene (Europrene ® Neocis BR40 - EniChem Elastomeri);
Silica: precipitated silica (Ultrasil ® VN3 - Degussa);
Silane: bis (3-triethoxysilylpropyl) tetrasulphide (product X50S containing 50% carbon black and 50% silane - Degussa) (the amounts given in the table refer only to the silane);
Antioxidant: N-(1,3-dimethylbutyl)-N'-phenyl-p-phenylenediamine (Vulkanox ® 4020 - Bayer);
Accelerator: N-cyclohexyl-1-2-benzothiazylsulphenamide (CBS) (Vulkacit ® CZ - Bayer).

The same measurements as in Examples 1-6 were carried out on the elastomeric compositions thus obtained. The results obtained are given in Table 4.

TABLE 4

| PROPERTIES | Ex. 7 (*) | Ex. 8 | Ex. 9 | Ex. 10 | Ex. 11 |
|---|---|---|---|---|---|
| \multicolumn{6}{c}{RHEOMETRIC PROPERTIES} | | | | | |
| TS2 (min) | 1.80 | 1.76 | 1.73 | 1.83 | 1.65 |
| T90 (min) | 5.60 | 5.44 | 4.68 | 6.47 | 5.78 |
| \multicolumn{6}{c}{MECHANICAL PROPERTIES} | | | | | |
| IRHD (23° C.) | 69.0 | 63.0 | 58.0 | 62.0 | 59.0 |
| IRHD (100° C.) | 64.0 | 60.0 | 56.0 | 59.0 | 56.0 |
| EY (23° C.) | 32.0 | 34.0 | 35.0 | 35.0 | 36.0 |
| CA 1 (MPa) | 2.4 | 2.1 | 2.2 | 1.7 | 2.0 |
| CA 3 (MPa) | 9.7 | 9.9 | 11.5 | 8.6 | 10.7 |
| SB (Mpa) | 15.3 | 15.8 | 15.7 | 12.9 | 15.7 |
| EB (%) | 420.0 | 459.4 | 409.0 | 432.6 | 435.4 |
| \multicolumn{6}{c}{DYNAMIC PROPERTIES} | | | | | |
| E' (0° C.) | 14.7 | 14.6 | 13.7 | 11.1 | 12.4 |
| E' (23° C.) | 9.1 | 9.2 | 7.5 | 6.2 | 6.7 |
| E' (70° C.) | 5.5 | 6.1 | 4.7 | 4.0 | 4.7 |
| Tan delta (0° C.) | 0.670 | 0.673 | 0.675 | 0.656 | 0.671 |
| Tan delta (23° C.) | 0.334 | 0.309 | 0.318 | 0.301 | 0.300 |
| Tan delta (70° C.) | 0.130 | 0.137 | 0.126 | 0.136 | 0.127 |
| \multicolumn{6}{c}{ABRASION} | | | | | |
| Abrasion | 90 | 48 | 64 | 54 | 55 |

(*): comparative.

EXAMPLES 12-15

The elastomeric compositions given in Table 5 were prepared according to the same methods described for Examples 1-6 (the amounts of the various components are expressed in phr).

TABLE 5

|  | \multicolumn{4}{c}{EXAMPLE} | | | |
|---|---|---|---|---|
|  | 12 (*) | 13 | 14 | 15 |
| S-SBR | 60.0 | 60.0 | 60.0 | 60.0 |
| BR | 40.0 | 40.0 | 40.0 | 40.0 |
| Aromatic oil | 15.0 | 15.0 | 15.0 | 15.0 |
| Carbon black | 70.0 | 70.0 | 70.0 | 70.0 |
| Stearic acid | 2.0 | 2.0 | 2.0 | 2.0 |
| Antioxidant | 2.0 | 2.0 | 2.0 | 2.0 |
| Zinc oxide | 2.0 | — | — | — |
| Cobalt naphthenate | — | 4.0 | — | — |
| Iron oxide | — | — | 3.5 | — |
| Manganese oxide | — | — | — | 3.5 |
| Accelerator | 1.5 | 1.5 | 1.5 | 1.5 |
| Sulphur | 1.5 | 1.5 | 1.5 | 1.5 |

(*) = comparative.
S-SBR: styrene/butadiene copolymer, obtained by solution polymerization, containing 25% by weight of styrene, mixed with 37.5 phr of oil (Buna ® VSL 5025-1 - Bayer);
BR: cis-1,4-polybutadiene (Europrene ® Neocis BR40 - EniChem Elastomeri);
Carbon black: N115 (Vulcan ® 9 - Cabot);
Antioxidant: N-(1,3-dimethylbutyl-N'-phenyl-p-phenylenediamine (Vulkanox ® 4020 - Bayer);
Accelerator: N-cyclohexyl-2-benzothiazylsulphenamide (CBS) (Vulkacit ® CZ - Bayer).

The same measurements as in Examples 1-6 were carried out on the elastomeric compositions thus obtained. The results obtained are given in Table 6.

TABLE 6

| PROPERTIES | Ex. 12 (*) | Ex. 13 | Ex. 14 | Ex. 15 |
|---|---|---|---|---|
| \multicolumn{5}{c}{RHEOMETRIC PROPERTIES} | | | | |
| TS2 (min) | 2.0 | 1.3 | 1.2 | 1.4 |
| T90 (min) | 4.4 | 2.6 | 4.4 | 4.9 |
| \multicolumn{5}{c}{MECHANICAL PROPERTIES} | | | | |
| IRHD (23° C.) | 75.0 | 76.0 | 73.0 | 72.0 |
| IRHD (100° C.) | 63.0 | 63.0 | 60.0 | 60.0 |
| EY (23° C.) | 44.0 | 44.0 | 43.0 | 43.0 |
| CA 1 (MPa) | 3.3 | 3.0 | 2.7 | 2.7 |
| CA 3 (MPa) | 12.3 | 12.2 | 12.0 | 12.3 |
| SB (MPa) | 14.2 | 15.2 | 14.5 | 14.5 |
| EB (%) | 320.0 | 396.0 | 381.0 | 332.0 |
| \multicolumn{5}{c}{DYNAMIC PROPERTIES} | | | | |
| E' (0° C.) | 15.6 | 15.3 | 15.0 | 15.0 |
| E' (23° C.) | 11.9 | 11.4 | 11.0 | 11.2 |
| E' (70° C.) | 8.5 | 8.4 | 8.0 | 8.2 |
| Tan delta (0° C.) | 0.348 | 0.343 | 0.351 | 0.354 |
| Tan delta (23° C.) | 0.246 | 0.243 | 0.253 | 0.259 |
| Tan delta (70° C.) | 0.181 | 0.183 | 0.195 | 0.201 |
| \multicolumn{5}{c}{ABRASION} | | | | |
| Abrasion | 74 | 74 | 70 | 74 |

(*): comparative.

EXAMPLES 16-18

The elastomeric compositions given in Table 7 were prepared according to the same methods described for Examples 1-6 (the amounts of the various components are expressed in phr).

TABLE 7

| | EXAMPLE | | |
|---|---|---|---|
| | 16 (*) | 17 | 18 |
| S-SBR A | 50.0 | 50.0 | 50.0 |
| S-SBR B | 25.0 | 25.0 | 25.0 |
| BR | 25.0 | 25.0 | 25.0 |
| Aromatic oil | 5.0 | 5.0 | 5.0 |
| Carbon black | 30.0 | 30.0 | 30.0 |
| Silica | 30.0 | 30.0 | 30.0 |
| Silane | 4.8 | 4.8 | 4.8 |
| Stearic acid | 2.0 | 2.0 | 2.0 |
| Antioxidant | 2.0 | 2.0 | 2.0 |
| Zinc oxide | 1.0 | — | — |
| Cobalt naphthenate | — | 2.0 | — |
| Iron oxide | — | — | 1.75 |
| Accelerator | 2.8 | 2.8 | 2.8 |
| Sulphur | 1.0 | 1.0 | 1.0 |

(*) = comparative.
S-SBR A: styrene/butadiene copolymer, obtained by solution polymerization, containing 25% by weight of styrene, mixed with 37.5 phr of oil (Buna ® VSL 5025-1 - Bayer);
S-SBR B: butadiene/styrene copolymer, obtained by solution polymerization, containing 25% by weight of styrene (NS116 ® - Nippon Zeon);
BR: cis-1,4-polybutadiene (Europrene ® Neocis BR40 - EniChem Elastomeri);
Carbon black: N115 (Vulcan ® 9 - Cabot);
Silica: precipitated silica (Ultrasil ® VN3 - Degussa);
Silane: bis(3-triethoxysilylpropyl) tetrasulphide (product X50S containing 50% carbon black and 50% silane - Degussa) (the amounts given in the table refer only to the silane);
Antioxidant: N-(1,3-dimethyl)- N'-phenyl-p-phenylenediamine (Vulkanox ® 4020 - Bayer);
Accelerator: N-cyclohexyl-2-benzothiazylsulphenamide (CBS) (Vulkacit ® CZ - Bayer).

The same measurements as in Examples 1-6 were carried out on the elastomeric compositions thus obtained. The results obtained are given in Table 8.

TABLE 8

| PROPERTIES | Ex. 16 (*) | Ex. 17 | Ex. 18 |
|---|---|---|---|
| RHEOMETRIC PROPERTIES | | | |
| TS2 (min) | 1.5 | 1.2 | 1.2 |
| T90 (min) | 5.0 | 3.9 | 3.9 |
| MECHANICAL PROPERTIES | | | |
| IRHD (23° C.) | 70.0 | 69.0 | 70.0 |
| IRHD (100° C.) | 63.5 | 63.0 | 64.0 |
| EY (23° C.) | 34.1 | 36.0 | 36.0 |
| CA 1 (MPa) | 2.6 | 2.3 | 2.4 |
| CA 3 (MPa) | 11.7 | 11.0 | 11.1 |
| SB (MPa) | 15.6 | 16.8 | 15.2 |
| EB (%) | 402.4 | 430.0 | 406.0 |
| DYNAMIC PROPERTIES | | | |
| E' (0° C.) | 16.4 | 15.0 | 16.7 |
| E' (23° C.) | 10.4 | 9.4 | 10.6 |
| E' (70° C.) | 6.4 | 6.7 | 6.6 |
| Tan delta (0° C.) | 0.548 | 0.532 | 0.534 |
| Tan delta (23° C.) | 0.317 | 0.307 | 0.315 |
| Tan delta (70° C.) | 0.156 | 0.161 | 0.170 |
| ABRASION | | | |
| Abrasion | 60 | 55 | 52 |

(*): comparative.

EXAMPLES 19-20

The elastomeric compositions given in Table 9 were prepared according to the same methods described for Examples 1-6 (the amounts of the various components are expressed in phr).

TABLE 9

| | EXAMPLE | |
|---|---|---|
| | 19 (*) | 20 |
| E-SBR | 100.0 | 100.0 |
| Aromatic oil | 5.0 | 5.0 |
| Silica | 60.0 | 60.0 |
| Silane | 10.0 | 10.0 |
| Stearic acid | 2.0 | 2.0 |
| Antioxidant | 2.0 | 2.0 |
| Zinc oxide | 2.0 | — |
| Cobalt naphthenate | — | 4.0 |
| Accelerator | 3.6 | 3.6 |
| Sulphur | 1.2 | 1.2 |

(*) = comparative.
E-SBR A: styrene/butadiene copolymer, obtained by emulsion polymerization, containing 40% by weight of styrene, mixed with 37.5 phr of oil (SBR ® 1721 - EniChem Elastomeri);
Silica: precipitated silica (Ultrasil ® VN3 - Degussa);
Silane: bis(3-triethoxysilylpropyl) tetrasulphide (product X50S containing 50% carbon black and 50% silane - Degussa) (the amounts given in the table refer only to the silane);
Antioxidant: N-(1,3-dimethylbutyl)-N'-phenyl-p-phenylenediamine (Vulkanox ® 4020 - Bayer);
Accelerator: N-cyclohexyl-2-benzothiazylsulphenamide (CBS) (Vulkacit ® CZ - Bayer).

The same measurements as in Examples 1-6 were carried out on the elastomeric compositions thus obtained. The results obtained are given in Table 10.

TABLE 10

| PROPERTIES | Ex. 19 (*) | Ex. 20 |
|---|---|---|
| RHEOMETRIC PROPERTIES | | |
| TS2 (min) | 1.5 | 1.3 |
| T90 (min) | 3.1 | 3.9 |
| MECHANICAL PROPERTIES | | |
| IRHD (23° C.) | 73.0 | 69.0 |
| IRHD (100° C.) | 57.0 | 54.0 |
| EY (23° C.) | 23.0 | 26.0 |
| CA 1 (MPa) | 2.5 | 2.5 |
| CA 3 (MPa) | 12.1 | 11.0 |
| SB (MPa) | 14.8 | 16.0 |
| EB (%) | 400.0 | 500.0 |
| DYNAMIC PROPERTIES | | |
| E' (0° C.) | n.d. | n.d. |
| E' (23° C.) | 11.8 | 11.2 |
| E' (70° C.) | 5.5 | 5.3 |
| Tan delta (0° C.) | n.d. | n.d. |
| Tan delta (23° C.) | 0.484 | 0.463 |
| Tan delta (70° C.) | 0.174 | 0.189 |
| ABRASION | | |
| Abrasion | 150 | 148 |

(*): comparative.

From the experimental results given above, it may be seen that the elastomeric composition of the present invention has improved abrasion resistance (which may be correlated to the amount of elastomeric composition removed) against substantially comparable performance qualities in terms of wet road holding and rolling resistance (which may be correlated, respectively, to the Tan delta values at 0° C. and at 70° C.). In addition, the mechanical properties also remain substantially unchanged. Said properties are obtained while maintaining acceptable vulcanization times. In particular, the abovementioned abrasion resistance shows improved values in the case of the compositions containing silica as reinforcing filler.

The invention claimed is:
1. A tire for a vehicle wheel, comprising:
at least one component made of a crosslinked elastomeric material;
wherein the at least one component comprises an elastomeric composition, comprising:

at least one diene elastomeric polymer;
at least one salt or oxide of a transition metal belonging to groups IIIA, IVA, VA, VIA, VIIA, or VIIIA of the Periodic Table of the Elements;
at least one vulcanization accelerator;
sulphur or derivatives thereof; and
at least one reinforcing filler; and
wherein the elastomeric composition is substantially free of zinc or derivatives thereof.

2. The tire of claim 1, comprising:
a carcass structure;
a belt structure applied in a circumferentially external position relative to the carcass structure;
a tread band superpositioned circumferentially relative to the belt structure; and
a pair of sidewalls applied laterally on opposite sides relative to the carcass structure;
wherein the carcass structure comprises at least one carcass ply,
wherein the at least one carcass ply is shaped in a substantially toroidal configuration,
wherein opposite lateral edges of the carcass structure are associated with respective bead wires,
wherein each bead wire is enclosed in a respective bead,
wherein the belt structure comprises at least one belt strip, and
wherein the at least one component comprising the elastomeric composition is the tread band.

3. The tire of claim 1, wherein the at least one diene elastomeric polymer comprises a glass transition temperature lower than 20° C.

4. The tire of claim 1, wherein the at least one diene elastomeric polymer comprises one or more of: cis-1,4-polyisoprene; 3,4-polyisoprene; poly(1,3-butadiene); optionally halogenated isoprene/isobutene copolymers; 1,3-butadiene/acrylonitrile copolymers; styrene/1,3-butadiene copolymers; styrene/isoprene/1,3-butadiene copolymers; and styrene/1,3-butadiene/acrylonitrile copolymers.

5. The tire of claim 1, wherein the at least one diene elastomeric polymer is obtained by solution polymerization.

6. The tire of claim 1, wherein the elastomeric composition further comprises at least one elastomeric polymer of one or more monoolefins with an olefinic comonomer or derivatives thereof.

7. The tire of claim 6, wherein the at least one elastomeric polymer of one or more monoolefins with an olefinic comonomer or derivatives comprises one or more of: ethylene/propylene copolymers (EPR);
ethylene/propylene/diene copolymers (EPDM); polyisobutene; butyl rubbers; and halobutyl rubbers.

8. The tire of claim 1, wherein the at least one salt of a transition metal is an organic or inorganic metal salt.

9. The tire of claim 8, wherein the organic metal salt comprises one or more of: saturated or unsaturated, aliphatic, alicyclic, or aromatic monocarboxylic or dicarboxylic acids containing from 1 to 22 carbon atoms; sulphonic acids; phosphonic acids; and boric acids.

10. The tire of claim 8, wherein the organic metal salt is:
a saturated, aliphatic carboxylic acid salt;
an unsaturated, aliphatic carboxylic acid salt;
a saturated, aromatic carboxylic acid salt; or
an unsaturated, aromatic carboxylic acid salt.

11. The tire of claim 10, wherein the aliphatic carboxylic acid comprises one or more of: formic acid; acetic acid; propionic acid; butyric acid; heptanoic acid; ethylhexanoic acid; octanoic acid; neodecanoic acid; and fatty acids such as stearic acid, oleic acid, linoleic acid, or palmitic acid.

12. The tire of claim 10, wherein the aromatic carboxylic acid comprises one or more of: benzoic acid, naphthoic acid, phthalic acid, and p-phenylenediacetic acid.

13. The tire of claim 8, wherein the organic metal salt comprises one or more of: cobalt naphthenate; nickel naphthenate; nickel octanoate; cerium octanoate; molybdenum octanoate; cobalt propionate; nickel propionate; iron octanoate; and nickel stearate.

14. The tire of claim 8, wherein the organic metal salt comprises cobalt naphthenate or nickel octanoate.

15. The tire of claim 8, wherein the inorganic metal salt comprises one or more of: hydroxides; halides; sulphates; carbonates; phosphates; and nitrates.

16. The tire of claim 8, wherein the inorganic metal salt comprises one or more of: iron hydroxide; cobalt hydroxide; cobalt carbonate; and iron sulphate.

17. The tire of claim 1, wherein the at least one oxide of a transition metal comprises one or more of: cobalt oxide; cerium oxide; molybdenum oxide; manganese oxide; and iron oxide.

18. The tire of claim 1, wherein the at least one oxide of a transition metal comprises iron oxide or manganese oxide.

19. The tire of claim 1, wherein the at least one salt or oxide of a transition metal is added to the elastomeric composition in an amount so that an amount of metal present in the elastomeric composition is greater than or equal to 0.05 phr and less than or equal to 5 phr.

20. The tire of claim 1, wherein the at least one salt or oxide of a transition metal is added to the elastomeric composition in an amount so that an amount of metal present in the elastomeric composition is greater than or equal to 0.5 phr and less than or equal to 2 phr.

21. The tire of claim 1, wherein the at least one vulcanization accelerator is selected from: thiazoles, sulphenamides, guanidines, thiurams, dithiocarbamates, Schiff's bases, and xanthates.

22. The tire of claim 1, wherein the at least one vulcanization accelerator is added to the elastomeric composition in an amount greater than or equal to 0.5 phr and less than or equal to 5 phr.

23. The tire of claim 1, wherein the at least one vulcanization accelerator is added to the elastomeric composition in an amount greater than or equal to 1 phr and less than or equal to 3 phr.

24. The tire of claim 1, wherein the sulphur or derivatives thereof are selected from:
soluble sulphur (crystalline sulphur);
insoluble sulphur (polymeric sulphur);
sulphur dispersed in oil; and
sulphur donors.

25. The tire of claim 1, wherein the sulphur or derivatives thereof are added to the elastomeric composition in an amount greater than or equal to 0.5 phr and less than or equal to 5 phr.

26. The tire of claim 1, wherein the sulphur or derivatives thereof are added to the elastomeric composition in an amount greater than or equal to 1 phr and less than or equal to 3 phr.

27. The tire of claim 1, wherein the at least one reinforcing filler comprises one or more of: carbon black, silica, alumina, aluminosilicates, calcium carbonate, and kaolin.

28. The tire of claim 1, wherein the at least one reinforcing filler comprises silica.

29. The tire of claim 28, wherein the elastomeric composition further comprises a silica coupling agent.

30. The tire of claim 1, wherein the at least one reinforcing filler is added to the elastomeric composition in an amount greater than or equal to 1 phr and less than or equal to 150 phr.

31. The tire of claim 1, wherein the at least one reinforcing filler is added to the elastomeric composition in an amount greater than or equal to 40 phr and less than or equal to 100 phr.

32. A tread band for a tire of a vehicle wheel, comprising:
a crosslinkable elastomeric composition, comprising:
at least one diene elastomeric polymer;
at least one salt or oxide of a transition metal belonging to groups IIIA, IVA, VA, VIA, VIIA, or VIIIA of the Periodic Table of the Elements;
at least one vulcanization accelerator;
sulphur or derivatives thereof; and
at least one reinforcing filler; and
wherein the elastomeric composition is substantially free of zinc or derivatives thereof.

33. The tread band of claim 32, wherein the at least one diene elastomeric polymer comprises a glass transition temperature lower than 20° C.

34. The tread band of claim 32, wherein the at least one diene elastomeric polymer comprises one or more of: cis-1,4-polyisoprene; 3,4-polyisoprene; poly(1,3-butadiene); optionally halogenated isoprene/isobutene copolymers; 1,3-butadiene/acrylonitrile copolymers; styrene/1,3-butadiene copolymers;
styrene/isoprene/1,3-butadiene copolymers; and styrene/1,3-butadiene/acrylonitrile copolymers.

35. The tread band of claim 32, wherein the at least one diene elastomeric polymer is obtained by solution polymerization.

36. The tread band of claim 32, wherein the elastomeric composition further comprises at least one elastomeric polymer of one or more monoolefins with an olefinic comonomer or derivatives thereof.

37. The tread band of claim 36, wherein the at least one elastomeric polymer of one or more monoolefins with an olefinic comonomer or derivatives comprises one or more of: ethylene/propylene copolymers (EPR); ethylene/propylene/diene copolymers (EPDM); polyisobutene; butyl rubbers; and halobutyl rubbers.

38. The tread band of claim 32, wherein the at least one salt of a transition metal is an organic or inorganic metal salt.

39. The tread band of claim 38, wherein the organic metal salt comprises one or more of: saturated or unsaturated, aliphatic, alicyclic, or aromatic monocarboxylic or dicarboxylic acids containing from 1 to 22 carbon atoms; sulphonic acids; phosphonic acids; and boric acids.

40. The tread band of claim 38, wherein the organic metal salt is:
a saturated, aliphatic carboxylic acid salt;
an unsaturated, aliphatic carboxylic acid salt;
a saturated, aromatic carboxylic acid salt; or
an unsaturated, aromatic carboxylic acid salt.

41. The tread band of claim 40, wherein the aliphatic carboxylic acid comprises one or more of: formic acid; acetic acid; propionic acid; butyric acid; heptanoic acid; ethylhexanoic acid; octanoic acid; neodecanoic acid; and fatty acids such as stearic acid, oleic acid, linoleic acid, or palmitic acid.

42. The tread band of claim 40, wherein the aromatic carboxylic acid comprises one or more of: benzoic acid, naphthoic acid, phthalic acid, and p-phenylenediacetic acid.

43. The tread band of claim 38, wherein the organic metal salt comprises one or more of: cobalt naphthenate; nickel naphthenate; nickel octanoate; cerium octanoate; molybdenum octanoate; cobalt propionate; nickel propionate; iron octanoate; and nickel stearate.

44. The tread band of claim 38, wherein the inorganic metal salt comprises one or more of: hydroxides; halides; sulphates; carbonates; phosphates; and nitrates.

45. The tread band of claim 32, wherein the at least one oxide of a transition metal comprises one or more of: cobalt oxide; cerium oxide; molybdenum oxide; manganese oxide; and iron oxide.

46. The tread band of claim 32, wherein the at least one vulcanization accelerator is selected from: thiazoles, sulphenamides, guanidines, thiurams, dithiocarbamates, Schiff's bases, and xanthates.

47. The tread band of claim 32, wherein the sulphur or derivatives thereof are selected from:
soluble sulphur (crystalline sulphur);
insoluble sulphur (polymeric sulphur);
sulphur dispersed in oil; and
sulphur donors.

48. The tread band of claim 32, wherein the at least one reinforcing filler comprises one or more of: carbon black, silica, alumina, aluminosilicates, calcium carbonate, and kaolin.

49. The tread band of claim 32, wherein the at least one reinforcing filler comprises silica.

50. The tread band of claim 49, wherein the elastomeric composition further comprises a silica coupling agent.

* * * * *